United States Patent [19]
Ady et al.

[11] Patent Number: 5,325,984
[45] Date of Patent: Jul. 5, 1994

[54] FRICTION CLUTCH FOR DUAL PIVOT POINT HINGE

[75] Inventors: Roger W. Ady, Lisle; William R. Groves, Naperville, both of Ill.

[73] Assignee: Motorola, Inc., Schaumburg, Ill.

[21] Appl. No.: 79,031

[22] Filed: Jun. 21, 1993

[51] Int. Cl.5 ............................................. B65D 85/57
[52] U.S. Cl. ..................................... 220/342; 220/343
[58] Field of Search ............... 220/342, 334, 235, 338, 220/343

[56] References Cited

U.S. PATENT DOCUMENTS

| | | |
|---|---|---|
| 2,546,590 | 3/1951 | Ferrel ................................... 220/342 |
| 4,684,017 | 8/1987 | Watanabe et al. . |
| 4,840,288 | 6/1989 | Lunderman et al. . |
| 4,892,189 | 1/1990 | Kunimune et al. .................. 220/342 |

Primary Examiner—Joseph Man-Fu Moy
Attorney, Agent, or Firm—Val Jean F. Hillman

[57] ABSTRACT

A friction clutch (440) for use with a 360 degree dual pivot point hinge (106) permits rotation about but one pivot point axis (444 or 445) at a time to assure proper 180 degree operation of each hinge member (411, 413 and 412, 414) associated with the hinge (106), thereby eliminating the misalignment problems typically experienced by dual pivot point hinges.

10 Claims, 4 Drawing Sheets

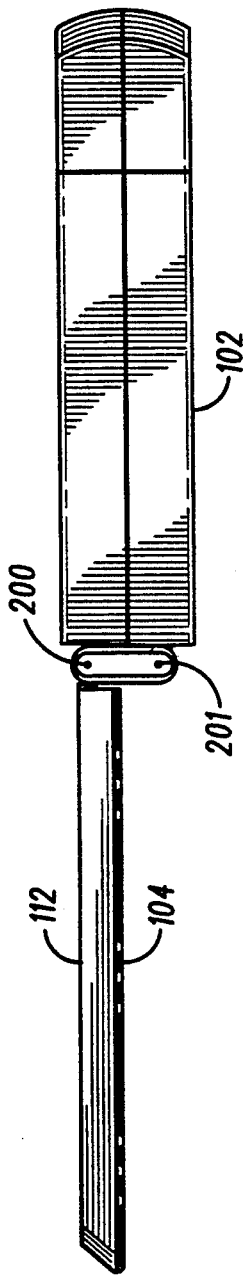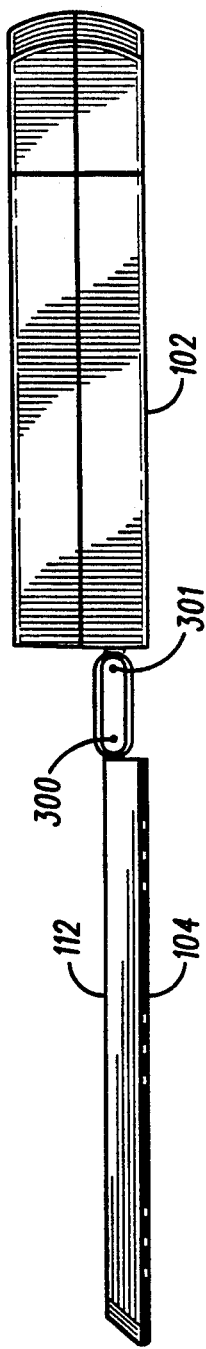

FRICTION CLUTCH FOR DUAL PIVOT POINT HINGE

TECHNICAL FIELD

The present invention generally relates to hinges, and particularly, to dual pivot point hinges. Specifically, the present invention relates to a clutch mechanism for use with a dual pivot point hinge adapted for use with electronic housing assemblies and the like.

BACKGROUND OF THE INVENTION

Electronic housing assemblies for enclosing portable computing and/or communicating devices such as portable computers, palm-top computers, electronic notebooks, portable personal organizers, portable intelligent communicators (PICs) and the like are known. Typically, such enclosures employ a lid or cover which is pivotally connected by a hinge or an equivalent mechanical mechanism to a device base or body. A display screen, integral to the cover, may be employed such that when the cover is closed, the display screen is protected from damage.

In most instances, the cover can only pivot to a limited extent (i.e., 90° to about 180°). As a result, known palm-top and lap-top computers and communicators typically provide a very limited number of screen or display orientations and generally offer the user only one or two ways of orienting the display screen.

U.S. patent application Ser. No. 07/999,515, filed Dec. 30, 1992 and assigned to the assignee of the present application discloses an enclosure for a portable computer, communicator and the like including a body portion and a cover having a user-viewable screen which are connected to each other by a hinge adapted to permit the cover to pivot 360 degrees relative to the body portion. This is accomplished through the use of a 360 degree dual pivot point or polycentric hinge.

As the cover is moved from its fully opened position to its fully closed position it will be appreciated that the cover may freely pivot about both hinge axes, simultaneously. This unrestricted freedom of motion presents a potential problem. The propensity of the hinge to rotate about both pivot points simultaneously during closure tends to cause the hinge to slip out of the position it would otherwise assume if functioning as a standard 180 degree hinge. Such propensity tends to cause the cover to misalign with the body and become ajar when it reaches the fully closed position, thereby failing to latch. The failure of the cover to properly latch, if undetected, could result in the inadvertent opening of the cover and damage to the display screen.

SUMMARY OF THE INVENTION

Briefly described, the present invention is a friction clutch for use with a dual pivot point hinge. The clutch comprises a support structure having two parallel end flanges, each end flange has a pair of apertures for accepting first and second clutch axles. The parallel end flanges are connected by a center beam disposed between the pair of apertures. The center beam employs spring anchors which establish spring member position and prevent spring member rotation. Each spring member has a loop that determines a spring wrap direction.

During assembly, the first clutch axle is inserted into the first aperture of the first end flange, through the loop of the first spring member and through the first aperture of the second end flange. Likewise, the second clutch axle is inserted into the second aperture of the first end flange, through the loop of the second spring member and through the second aperture of the second end flange.

In response to torque exerted upon the clutch axles during hinge operation, the first and second spring members exert a braking friction upon the first and second clutch axles, said braking friction permits the rotation of but one clutch axle at a time. Such restricted rotation assures proper 180 degree operation of each hinge member associated with the 360 degree hinge, thereby eliminating the alignment problems typically experienced by dual pivot point hinges.

BRIEF DESCRIPTION OF THE DRAWINGS

FIG. 2 is a left side elevation view of the portable computer enclosure of FIG. 1 wherein the display portion is opened approximately 180 degrees relative to the body portion and about the first pivot point axis;

FIG. 3 is a left side elevation view of the portable computer enclosure of FIG. 1 wherein the display portion is opened approximately 180 degrees relative to the body portion and about the second pivot point axis;

DETAILED DESCRIPTION OF A PREFERRED EMBODIMENT

Figure 1:
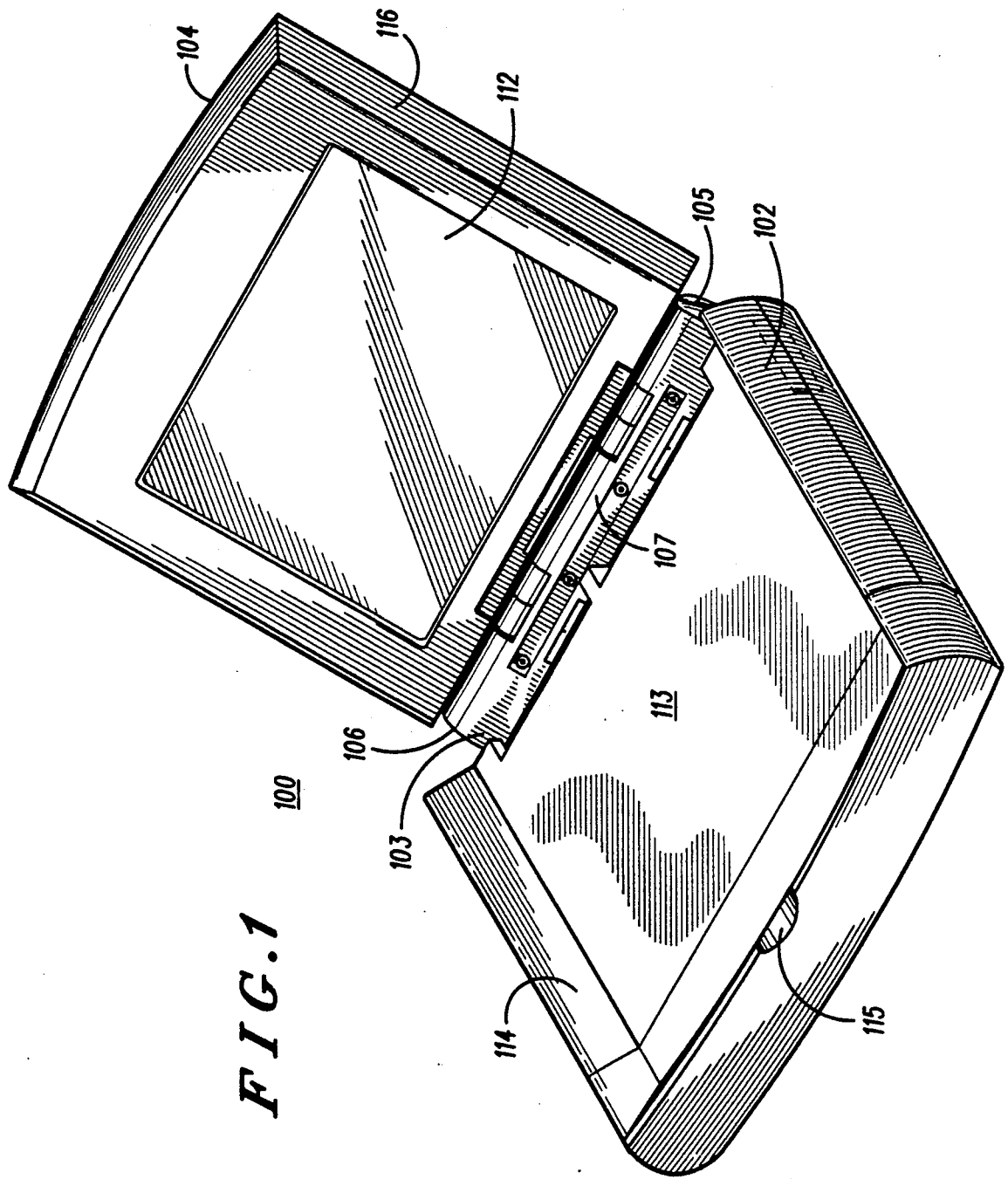
FIG. 1 is a top, right, and front perspective view showing an embodiment of a portable computer enclosure which employs the present invention.

The present invention is a friction clutch for use with a dual pivot point (polycentric) hinge like those employed in the field of portable computer housing assemblies and/or enclosures. FIG. 1 is a top, right, and front perspective view showing an embodiment of a portable computer enclosure which employs the present invention. The portable computer enclosure, shown generally by reference numeral 100, comprises a body portion 102 and a cover 104 which are coupled together by a hinge 106.

The cover 104 comprises a display screen 112, which is preferably a touch-sensitive screen employing well known touch screen techniques by which data may be entered into the computer housed within the enclosure 100. Data entry may be by way of a finger or stylus as is known in the art.

Body portion 102 comprises a central cavity 113 which is adapted to receive the display screen 112 when cover 104 is in a closed orientation. At least three interior side walls 114 of cavity 113 are tapered from the base of the cavity upwards and outwards. The edges 116 of cover 104 are tapered to mate with the side walls 114 of cavity 113 when cover 104 is in the fully closed position. A locking mechanism 115 is provided in an upper surface of body portion 102 and a lower surface of cover 102 to enable the user to lock cover 104 in place when fully closed, thereby protecting the display screen 112 during storage and/or transportation.

Figure 4:
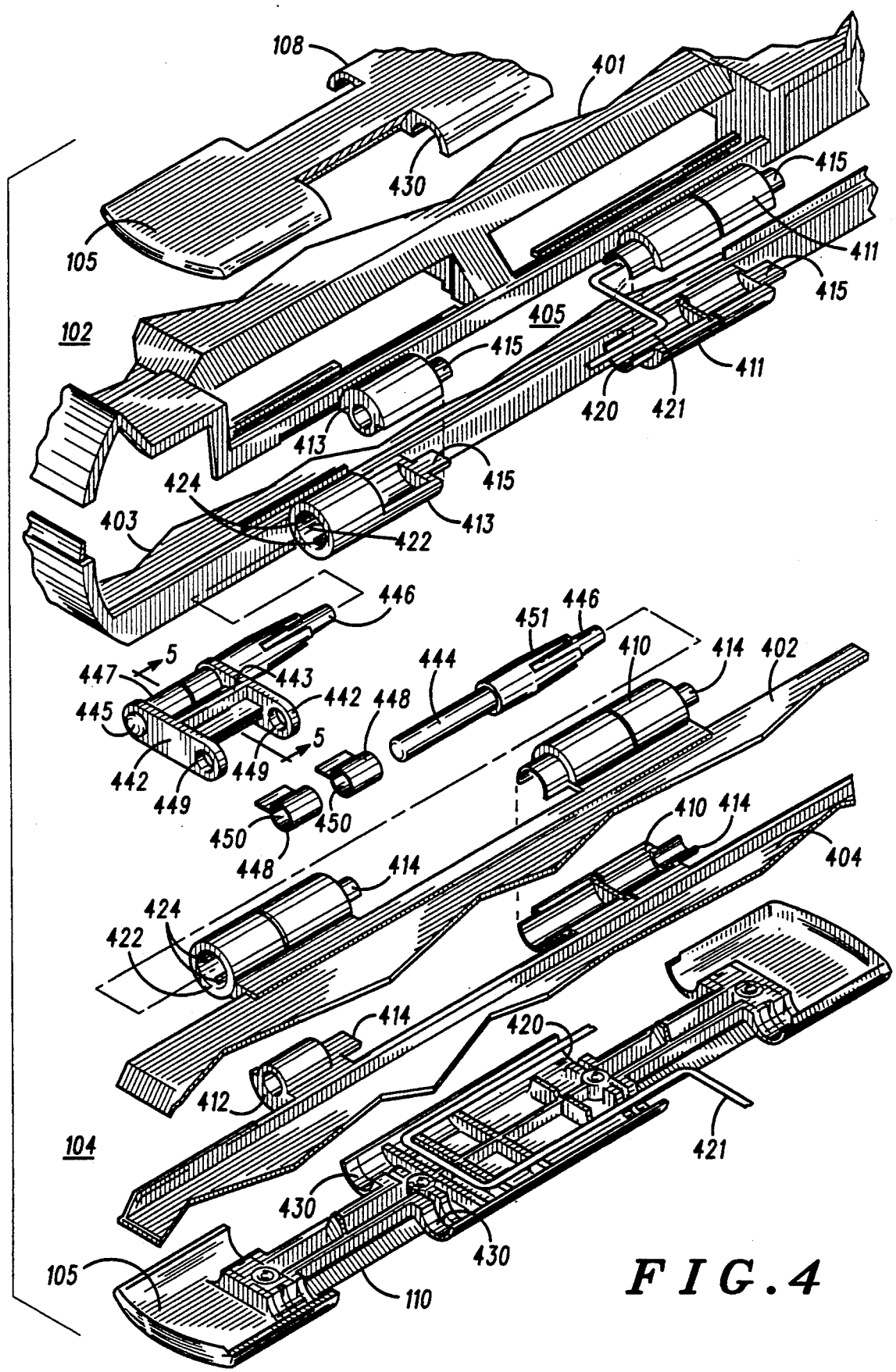
FIG. 4 is an exploded view of the portable computer enclosure of FIG. 2.

Hinge 106 comprises fist and second hinge members 108 and 110 as shown with reference to FIG. 4. Each hinge member 108 and 110 comprises a central portion 107 and two end portions 103 and 105, respectively. The central portion 107 is designed to mate with two parallel axles (not shown), one of which is associated primarily with body portion 102 and the other of which is associated primarily with cover 104. When central portions 107 of hinge members 108 and 110 are assembled around the two parallel axles and connected together with end caps 103 and 105 which snap together, body portion 102 and cover 104 are connected together via a 360 degree dual pivot point hinge 106.

Of note, flexible circuitry and/or wiring connections are employed within channels disposed within the parallel axles and the hinge members to allow the necessary electrical connections between body portion 102 and cover 104 while permitting full 360 degrees of motion between cover 104 and body portion 102. Because such circuitry and/or wiring is disposed within hollow channels within hinge axles (not shown) and hinge members 108 and 110, they are protected from the possibility of external damage, as well as any damage due to the stress typically associated with continuous flexing of thin conductors.

FIGS. 2 and 3 are both left side elevation views of the portable computer enclosure of FIG. 1. FIG. 2 shows one basic display screen orientation, namely a "lap-top mode" wherein cover 104 and display screen 112 are angled at approximately 180 degrees relative to body portion 102 about a first pivot point axis 200. FIG. 3 shows yet another basic display screen orientation wherein cover 104 and display screen 112 are opened approximately 180 degrees relative to body portion 102 about a second pivot point axis 301.

As cover 104 is moved from the position shown in FIG. 3 to its fully closed position, it will be appreciated that cover 104 may freely pivot about either axis 300 or 301 of hinge 106. This unrestricted freedom of motion presents a number of potential problems. For example, because of the unrestricted freedom of motion, hinge 106 is prone to slip out of the position it assumes when functioning as a 180 degree hinge about pivot point (axis) 300. The propensity of hinge 106 to freely rotate about either pivot point 300 or 301 creates the possibility that cover 104 will misalign with body portion 102 and become ajar when it reaches the fully closed position. Such misalignment may cause latching mechanism 115 to fail to properly latch. The failure of cover 104 to properly latch, if undetected, could result in the inadvertent opening of cover 104 during transportation. Such an unplanned opening of the cover could result in catastrophic damage to display screen 112.

In order to alleviate this potential problem, hinge 106 employs a friction clutch as described herein below. This device operates to prevent cover 104 from slipping, relative to body portion 102, after cover 104 has been set in a desired orientation by the user. Moreover, this friction clutch operates to permit cover 104 to move relative to said body portion 102 about but one pivot axis at a time. By restricting the cover's movement relative to body portion 102 to but a single pivot point at a time, the clutch assure proper 180 degree operation of each hinge member associated with hinge 106, thereby eliminating the misalignment problems typically experienced by dual pivot point (polycentric) hinges of the type described in association with the preferred embodiment of the present invention.

FIG. 4 is a partial exploded view of the portable computer enclosure 100 as shown in FIG. 1. Commencing with body 102 of enclosure 100, FIG. 4 depicts a partial view of the body 102 which comprises an upper and a lower portion 401 and 403, which respectively combine to define a cavity 405 which maintains the electronic circuitry comprising a computer or other electronic device for enclosure within body portion 102 as determined by a particular application.

Fashioned into external side walls of upper and lower portions 401 and 403 of body 102 are hollow axle members 411 and 413. When upper and lower sections 401 and 403 of body portion 102 are assembled, hollow axle members 411 and 413 join together to define a pair of hollow parallel axles which are thereafter associated with body portion 102. As shown in FIG. 4, male features 415 of hollow axle members 411 and 413 engage female features 430 of hinge members 108 and 110 during assembly.

Referring now to cover 104, FIG. 4 depicts a partial view of cover 104 which, like body portion 102, is comprised of upper and lower sections 402 and 404, which respectively combine to define a cavity 406 which maintains the display screen 112 and/or other electronic circuitry for enclosure within cover 104. Fashioned into external side walls of upper and lower sections 402 and 404 are hollow axle members 410 and 412. When upper and lower sections 402 and 404 of cover 104 are assembled, hollow axle members 410 and 412 join together to define a pair of hollow parallel axles which are thereafter associated with cover 104. As shown in FIG. 4, male features 414 of hollow axle members 410 and 412 engage female features 430 of hinge members 108 and 110 during assembly to complete the 360 degree hinge 106 and couple body portion 102 to cover 104.

With reference to FIG. 4 the hollow axle members 411 of body 102, hollow axle members 410 of cover 104, and hinge members 108 and 110 are fashioned to form a channel 420 for accepting flexible circuitry and/or wiring connections 421 which facilitate an electrical connection between the electronic circuitry disposed within cavity 405 of body portion 102 and display screen 112 disposed within the cavity 406 of cover 104. As previously mentioned, the channel 420 protects the wiring 421 from external damage and limits the stress typically associated with the continuous flexing of the thin metal conductors. Similarly, hollow axle members 413 of body portion 102 and hollow axle members 412 of cover 104 are fashioned to form chambers 422 having tongues 424 for use as described herein below.

In accordance with the preferred embodiment, body portion 102, hollow axle members 411 and 413, hinge members 108 and 110, cover 104, and hollow axle members 410 and 412 are made of a plastic such as polycarbonate. This material combines a relatively high impact performance with enough tensile strength in order to insure mechanical and environmental stability. In addition, polycarbonate components are easily fixed together utilizing well known adhering, fusing and welding techniques. Notwithstanding, several other plastics provide available alternatives, such as, but not limited to: Polyaryl Sulfone and Liquid Crystal Polymers.

It will be appreciated by those skilled in the art that both body portion 102, hollow axle members 411 and 413, hinge members 108 and 110, cover 104, and hollow axle members 410 and 412 of the present invention are producible utilizing various injection-molding and extrusion techniques. For additional discussion on state of the art injection molding and extrusion techniques, refer to: Dubois, H. J., Pribble, W. I., "Plastics Mold Engineering Handbook," 3rd Edition, Van Nostrund Reinhold Company, New York 1978.

It will be further appreciated by those skilled in the art, that the body portion 102, hollow axle members 411 and 413, hinge members 108 and 110, cover 104, and hollow axle members 410 and 412 of the present invention may be made of metal and formed via any of the well known die casting techniques, without departing from the spirit of the present invention.

Continuing with the description of FIG. 4, an exploded view of a friction clutch 440 for use by the dual pivot point hinge of the present invention is shown. Friction clutch 440 comprises frame 441 having end flanges 442 and center beam 443, clutch axles 444 and 445, torque sleeves 446 and wrap spring members 447 and 448. As shown, each end flange 442 has two apertures 449 for accepting torque axles 444 and 445, respectively. Each clutch axle 444 and 445 is equipped with a torque sleeve 446. The ends of clutch axles 444 and 445 bearing sleeves 446 are inserted into chambers 422 constructed by hollow axle members 412 and 413 of cover 104 and body portion 102, respectively. Torque sleeves 446 operate to secure the upper and lower sections 401 and 403 of body portion 102 and upper and lower sections 402 and 404 of cover 104 together during assembly.

As previously mentioned, each chamber 422 is fashioned to comprise tongues 424. In correspondence therewith, sleeves 446 are fashioned to comprise grooves 451 which mate with tongues 424 disposed within chambers 422. As will be appreciated, the tongue 424 and groove 451 combination operates to transfer torque from hinge axles 412 and 413 to clutch axles 444 and 445, respectively.

As shown, the unsleeved end of clutch axle 444 or 445 is passed through an aperture 449 in an end flange 442, through a loop 450 in wrap spring members 447 or 448 and then through an aperture 449 in a second end flange 442. The entire friction clutch assembly 440 is disposed within an end cap portion 103 or 105 of hinge 106 of FIG. 1.

During operation of 360 degree hinge 106, friction clutch 440 operates to keep cover 104 from slipping, relative to body 102, after cover 104 has been set in a desired orientation by the device user. In addition, friction clutch 440 operates to permit cover 104 to move relative to said body portion 102 about one pivot axis (444 or 445) at a time. By restricting cover 104 movement relative to body 102 to a single pivot point at a time, clutch 440 assures proper 180 degree operation of each hinge member associated with the 360 degree hinge of the present invention. Single pivot point operation, in accordance with the present invention, tends to eliminate those alignment problems typically experienced by dual pivot point (polycentric) hinges.

Figure 5:
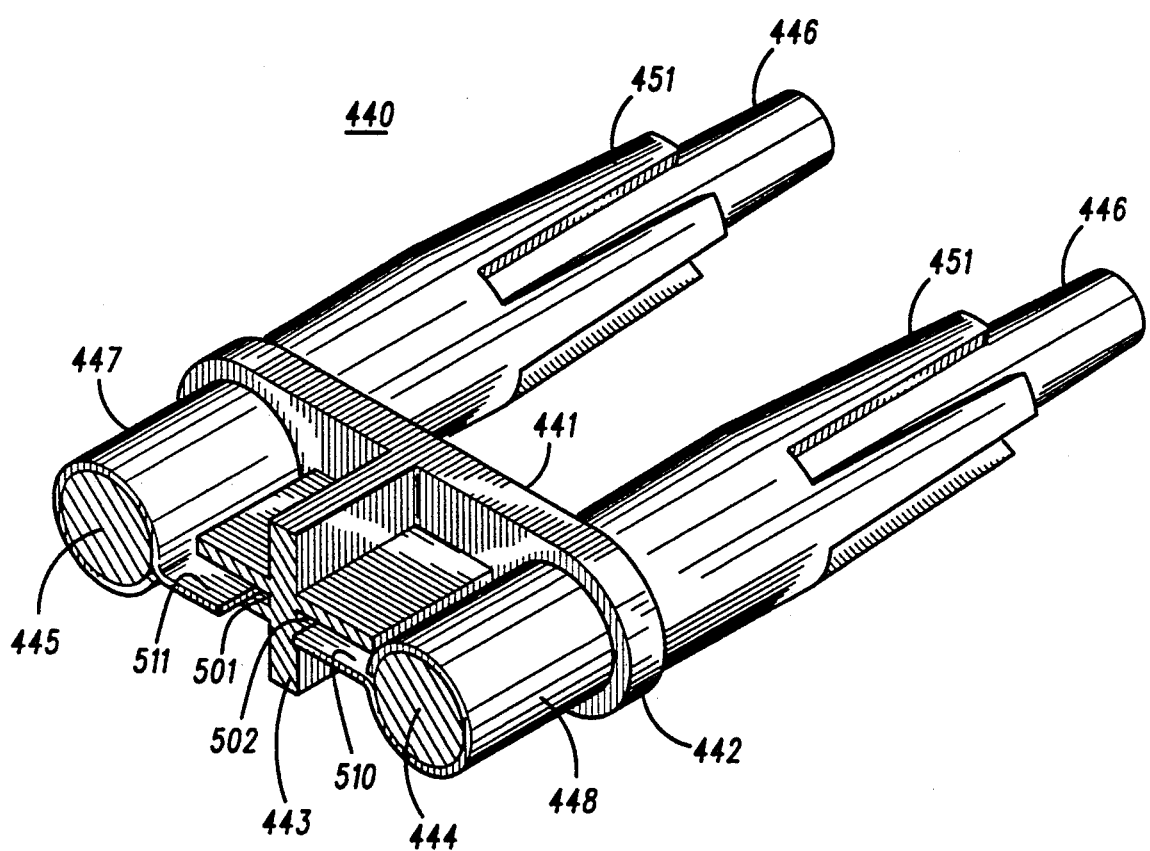
FIG. 5 is a partial cross-sectional view, taken along lines 5—5 in FIG. 4 and looking in the direction of the arrows, of the friction clutch as illustrated in FIG. 4.

FIG. 5 is a partial cross-sectional view, taken along lines 5—5 in FIG. 4 and looking in the direction of the arrows, of friction clutch 440. As shown, clutch frame 441 comprises end flange 442 and center beam 443. Center beam 443 employs a first and a second spring notch 501 and 502 which run parallel to the axes of apertures 449 and parallel to the axes of clutch axles 444 and 445.

Clutch axles 444 and 445 are shown projecting through apertures 449 in the end flange 442. Wrap spring 448 and 447 wrap around and engage respective clutch axles 444 and 445 as shown. Wrap springs 447 and 448 are anchored via tabs 511 and 510 which are inserted into the first and second spring notches 501 and 502, respectively. Spring notches 501 and 502 act as anchors which establish wrap spring positioning and prevent wrap spring rotation during the rotation of clutch axles 444 and 445.

Wrap springs 448 and 447 are designed to provide differing amounts of braking friction (i.e., resistance) to clutch axles 444 and 445 depending upon the direction of the clutch axle's rotation. In particular, the magnitude of the wrap spring braking friction exerted upon a clutch is greatest when the clutch axle's direction of rotation coincides with the wrap direction of an associated wrap spring. Conversely, the magnitude of the wrap spring braking friction exerted upon a clutch axle is least when the clutch axle's direction of rotation is opposite to the wrap direction of an associated wrap spring.

In accordance with the present invention, maximum wrap spring braking resistance should not prohibit clutch axle rotation, but should provide greater resistance to rotation than that exerted during rotation in a direction opposite to the wrap of the associated wrap spring. Of note, when a clutch axle ceases to rotate, the associated wrap spring will engage the axle via loop 450 of FIG. 4 to hold the axle's position relatively constant in order to avoid slippage of cover 104.

An advantage of the present invention is that differing amounts of braking friction are exerted upon clutch axles 444 and 445 by wrap springs 448 and 447 in order to permit cover 104 to move relative to body 102 about but a single pivot point axis at a time, thereby assuring proper 180 degree operation of each hinge member of dual pivot point hinge 106 and eliminating the misalignment problems exhibited by prior dual pivot point hinges.

With reference to FIG. 5, friction clutch 440 operates to isolate movement of cover 104 relative to body portion 102 about a single pivot point at a time. Isolated pivot point movement is achieved in both the opening and closing direction by selectively orienting the directionality of wrap springs 447 and 448 as shown in FIG. 5. Specifically, wrap spring 448, which is associated with torque axle 444, which in turn is coupled to cover 104, is oriented such that the wrap direction as viewed in FIG. 5 is counterclockwise. Wrap spring 447, which is associated with torque axle 445, which is in turn coupled to body 102, is oriented such that the wrap direction as viewed in FIG. 5 is counter clockwise.

During the opening of cover 104, torque is applied to clutch axle 444 which attempts to rotate axle 444 in a clockwise direction (i.e., opposite to the direction of the wrap of wrap spring 448). In this situation, wrap spring 448 will exert a minimum (least) amount of braking friction upon clutch axle 444. The opening of cover 104 also causes torque to be applied to clutch axle 445. This torque attempts to rotate clutch axle 445 in a counterclockwise direction (i.e., in the direction of the wrap of wrap spring 447). In this situation, wrap spring 447 will exert a maximum amount of braking friction upon clutch axle 445. In the above-described scenario, cover 104 will tend to rotate 180 degrees relative to body portion 102 and about clutch axle 444 until it reaches a mechanical stop (not shown). Once cover 104 reaches the stop position, e.g., 180 degrees relative to body portion 102, the remaining 180 degrees of travel relative to body portion 102 will be about clutch axle 445.

During the closing of cover 104, torque is applied to clutch axle 444 which attempts to rotate clutch axle 444 in the direction of the wrap of wrap spring 448. In this situation, wrap spring 448 will exert a maximum amount of braking friction upon clutch axle 444. The closing of cover 104 will likewise exert torque upon clutch axle 445 which attempts to rotate clutch axle 445 in a direction opposite to the direction of the wrap of wrap spring 447. Under these circumstances, cover 104 will tend to rotate 180 degrees relative to body portion 102 and about clutch axle 445 until it reaches a mechanical stop (not shown). From this point on, cover 104 will rotate 180 degrees relative to body portion 102 about clutch axle 444 back to the fully closed position.

It will be appreciated by those skilled in the art that various wrap spring orientations may be employed by clutch 440 in order to achieved the controlled operation of hinge 106 or the controlled opening and closing of cover 104, depending upon the particular application. Such modified orientations are considered well within the scope of the present invention which is a friction clutch 440 for use with a 360 degree dual pivot point hinge which permits rotation about but one pivot axis at a time to assure proper 180 degree operation of each hinge member associated with the hinge, thereby eliminating the misalignment problems typically experienced by prior dual pivot point hinges.

What is claimed is:

1. An electronic assembly enclosure comprising a body; a cover; hinging means for hinging said cover to said body such that said cover is movable relative to said body and locatable in a plurality of positions from 0 to 360 degrees relative to said body, said hinging means including first and second hinge axles for permitting said cover to move relative to said body about a first and a second pivot axis; and a friction clutch, having first and second clutch axles coupled to the first and second hinge axles for receiving torque from the first and second hinge axles during rotation of the cover relative to the body, said clutch further comprising first and second spring members clamped to the first and second clutch axles for exerting a braking friction upon the first and second clutch axles, in response to the torque exerted upon the clutch axles, said braking friction permitting said cover to move relative to said body about but one pivot axis at a time.

2. An electronic assembly enclosure comprising:
a body; a cover; a 360 degree dual pivot point hinge having first and second hinge axles, associated with first and second pivot point axes, for hinging the cover to the body and permitting the cover to rotate relative to the body about the first and the second pivot point axes through a plurality of positions from 0 to 360 degrees relative to the body; and a friction clutch, having first and second clutch axles coupled at a first end to the first and second hinge axles for receiving torque from the first and second hinge axles during rotation of the cover relative to the body, said clutch comprising:
an H-shaped support structure having two parallel end flanges, each end flange having a pair of apertures for accepting a second end of the first and the second clutch axles, the parallel end flanges being connected by a center beam disposed between the pair of apertures, the center beam having spring anchoring means; and
first and second spring members, anchored to the support structure via the spring anchoring means, each spring member having a loop that determines a spring wrap direction, wherein the second end of the first clutch axle is inserted into the first aperture of the first end flange, through the loop of the first spring member and through the first aperture of the second end flange, and the second end of the second clutch axle is inserted into the second aperture of the first end flange, through the loop of the second spring member and through the second aperture of the second end flange, such that the first and second spring members anchored to the support structure, exert a braking friction upon the first and second clutch axles, in response to torque exerted upon the clutch axles by the hinge axles, said braking friction permitting the cover to rotate relative to the body about but one pivot point axis at a time.

3. A friction clutch having first and said second clutch axles for use with a dual pivot point hinge, said hinge having first and second hinge axles for transferring torque to said first and second clutch axles, said friction clutch comprising:
a support structure having first and second parallel end flanges, each end flange having a pair of apertures for accepting an end of said first and said second clutch axles, respectively, said first and second parallel end flanges being connected by a center beam disposed between said pair of apertures, said center beam having spring anchoring means; and
first and second spring members, anchored to the support structure via the spring anchoring means, each spring member having a loop that determines a spring wrap direction, wherein said end of said first clutch axle is inserted into the first aperture of the first end flange, through the loop of said first spring member and through the first aperture of the second end flange, and said end of said second clutch axle is inserted into the second aperture of the first end flange, through the loop of said second spring member and through the second aperture of the second end flange such that the first and second spring members exert a braking friction upon the first and second clutch axles, in response to torque exerted upon the axles by the hinge members, said braking friction permitting rotation about but one clutch axle at a time.

4. The friction clutch of claim 3 wherein the magnitude of the braking friction exerted upon a clutch axle by a spring member changes as a function of the direction of the axle's rotation.

5. The friction clutch of claim 4 wherein the magnitude of the braking friction exerted upon a clutch axle by a spring member is greatest when the direction of the axle's rotation coincides with the spring wrap direction.

6. The friction clutch of claim 4 wherein the magnitude of the braking friction exerted upon a clutch axle by a spring member is least when the direction of the axle's rotation is opposite to the spring wrap direction.

7. The friction clutch of claim 3 wherein the first and second spring members are selected from the group of springs consisting of: wrap springs and coiled springs.

8. An electronic assembly enclosure comprising:
a body, said body comprising detachable upper and lower portions which define a cavity, said upper and lower portions having integral features which combine to define first and second parallel and hollow hinge axle members;
a cover, said cover comprising detachable upper and lower portions which define a cavity, said upper and lower portions having integral features which combine to define first and second parallel and hollow hinge axle members;

detachable hinge members, each member having end caps and a center section for coupling the first and second parallel and hollow hinge axle members of the body to the first and second parallel and hollow hinge axle members of the cover to form a 360 degree dual pivot point hinge having first and second pivot point axes defined by the parallel and hollow hinge axle members of the body and the cover, for permitting the cover to rotate relative to the body about the first and the second pivot point axes through a plurality of positions from 0 to 360 degrees relative to the body; and a friction clutch, having a first and a second clutch axle coupled to the hollow hinge axle members of said base and said cover, for receiving torque from said hollow hinge axle members during rotation of the cover relative to the body, said clutch further comprising first and second spring members clamped to the first and second clutch axles for exerting a braking friction upon the clutch axles in response to the torque exerted upon the clutch axles, said braking friction permitting said cover to move relative to said body about but one pivot point axis at a time.

9. The enclosure of claim 8 wherein the first hollow hinge axle member of the cover and the first hollow hinge axle member of the body are fashioned to define a hollow channel for accepting electrical conductors which provide an electrical connection between the body and the cover.

10. The enclosure of claim 8 wherein the second hollow hinge axle member of the cover and the second hollow hinge axle member of the body are fashioned to comprise means for transferring torque to the friction clutch in response to movement of the cover relative to the body.

* * * * *